United States Patent [19]

Hunter

[11] Patent Number: 4,890,048
[45] Date of Patent: Dec. 26, 1989

[54] LOW TORQUE RIPPLE STEPPING MOTOR CONTROLLER CIRCUIT

[76] Inventor: L. Wayne Hunter, 15075 NW. Pioneer Rd., Beaverton, Oreg. 97006

[21] Appl. No.: 295,591

[22] Filed: Jan. 9, 1989

[51] Int. Cl.$^4$ .............................................. H02P 8/00
[52] U.S. Cl. ..................................... 318/696; 318/685
[58] Field of Search ................................. 318/696, 685

[56] References Cited

U.S. PATENT DOCUMENTS

| | | | |
|---|---|---|---|
| 4,103,216 | 7/1978 | Hayen | 318/685 |
| 4,587,473 | 5/1986 | Turvey | 318/696 |
| 4,691,154 | 9/1987 | Sato et al. | 318/696 |
| 4,737,700 | 4/1988 | Doelver | 318/696 |

Primary Examiner—William M. Shoop, Jr.
Assistant Examiner—Saul M. Bergmann
Attorney, Agent, or Firm—Dellett, Smith-Hill & Bedell

[57] ABSTRACT

A stepping motor controller supplies a pulsed input signal to a motor driver controlling rotation of a stepping motor. To accelerate or decelerate the motor, the controller linearly increases or decreases the frequency of the motor driver input signal at a rate proportional to a desired angular acceleration value conveyed in an input command. The controller includes a computer responding to a low frequency interrupt signal by periodicaly adding the acceleration value to an accumulated velocity value, adding the accumulated velocity value to an accumulated displacement value, and adjusting an output angular displacement value in accordance with the amount of overflow of the accumulated displacement value. A hardware accumulator responds to a high frequency clock signal by periodically incrementing an accumulated number by the output angular displacement value of the computer, the accumulator generating a pulse of the motor driver input signal whenever the accumulated number overflows.

12 Claims, 3 Drawing Sheets

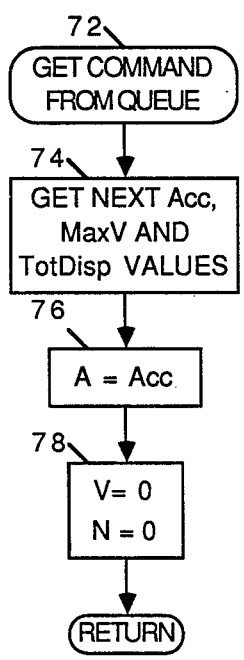
FIG. 8
FIG. 10
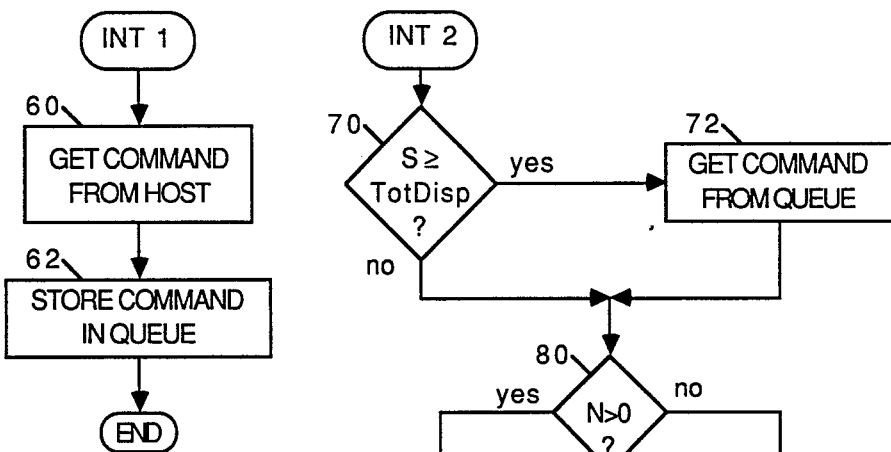
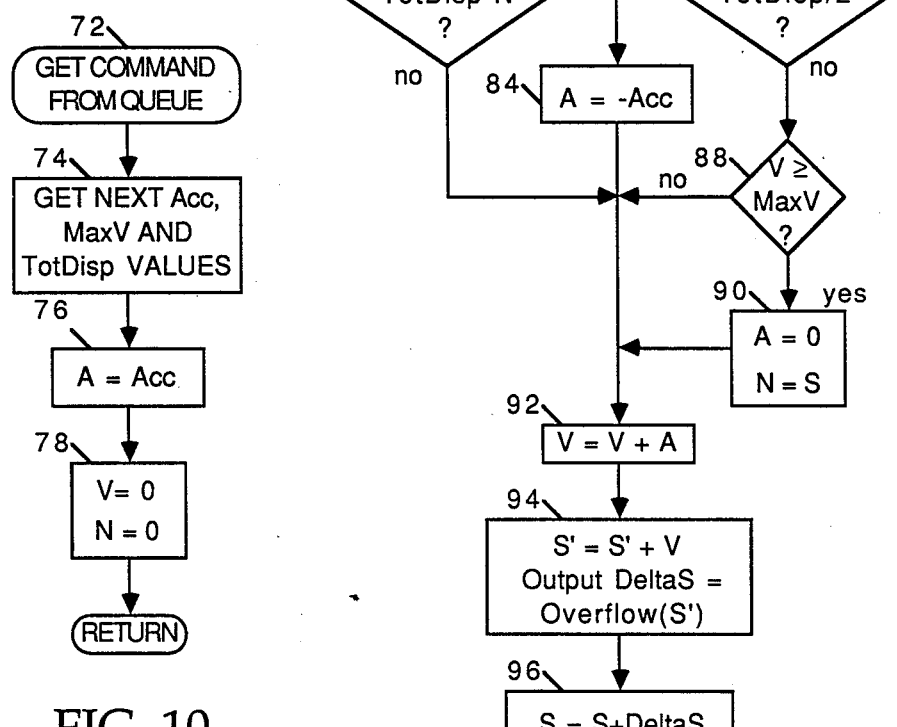
FIG. 9

LOW TORQUE RIPPLE STEPPING MOTOR CONTROLLER CIRCUIT

CROSS-REFERENCE TO RELATED APPLICATION

The subject matter of U.S. Pat. No. 4,734,847 entitled "Microstepping Motor Controller Circuit", issued Mar. 29, 1988, is incorporated herein by reference.

BACKGROUND OF THE INVENTION

The present invention relates to a controller for a stepping motor and in particular to a controller that minimizes torque ripple.

A conventional stepping motor driver controls a stepping motor in response to a pulsed input signal from a motor controller. Whenever the driver receives an input signal pulse, the driver appropriately adjusts current on windings of the stepping motor such that the stepping motor rotates through a small, predetermined angle. Stepper motors are often used for precisely controlling movement of an object, for example, a stepping motor in a robot arm may move a load horizontally one centimeter for each revolution of the stepping motor, and the stepping motor may revolve once for each 100 input signal pulses supplied to its driver. A motor controller can easily control the distance the arm moves the load with a resolution of 1/100th of a centimeter by supplying the appropriate number of input signal pulses to the motor driver.

In many applications a controller must not only precisely control the total angular displacement of a stepping motor but also must precisely control its angular velocity and acceleration. For example, when a stepping motor is to operate at some constant angular velocity, a controller applies a pulsed input signal of the appropriate frequency to the stepping motor driver. However, since a stepping motor can accelerate or decelerate only at finite maximum rates, the motor controller should not abruptly change the frequency of an input signal to the motor driver in changing its angular velocity. Instead, the motor controller should gradually increase or decrease the frequency of the driver input signal thereby causing the stepping motor to accelerate or decelerate at a controlled rate.

My U.S. Pat. No. 4,734,847, incorporated herein by reference, describes a controller for supplying a pulsed signal input to a stepping motor driver in response to an input command from a host computer. The input command tells the controller the total angular displacement of the motor (e.g. 1,000,000 angular displacement steps), the desired rate of angular acceleration or deceleration of the stepping motor (e.g. 20,000 steps/sec$^2$), and a maximum angular velocity of the stepping motor (e.g. 100,000 steps/sec). In response to the input data, the motor controller linearly increases the frequency of the pulsed input signal to the driver (e.g. from 0 to 100,000 pulses/sec) such that the motor accelerates with the desired angular acceleration up to the indicated maximum angular velocity. The controller then maintains the motor at that maximum velocity while counting the number of input signal pulses transmitted to the motor driver. The count enables the controller to determine how close the load is to its desired final angular displacement. At some point the controller begins decelerating the stepping motor at the desired deceleration rate by reducing the frequency of its pulsed output signal at a controlled rate. The controller chooses the point to commence deceleration such that when the stepping motor reaches zero angular velocity, the motor has rotated through the desired total angular displacement.

The motor controller described by the prior patent includes a computer periodically executing an interrupt routine that accumulates the acceleration data to determine a current angular velocity value. The interrupt routine also accumulates the angular velocity value to produce an angular displacement value. An overflow value resulting from the latter accumulation is proportional to a desired incremental angular displacement of the motor between interrupts. The interrupt routine stores this incremental angular displacement value in an external register, and the stored value controls the frequency of an output signal provided by a hardware rate multiplier. The rate multiplier output signal supplies the pulsed input signal to the stepping motor driver.

When a stepping motor accelerates or decelerates at a constant rate or rotates at a constant velocity, the motor applies a constant torque to its load. However, when the rate of change of frequency of the motor driver input signal oscillates about some nominal value, the stepping motor applies an oscillating torque to the load. This "torque ripple" shakes the load and can damage the load or its supporting structure. A controller should therefore minimize torque ripple by smoothly increasing or decreasing the frequency of the stepping motor driver input signal when accelerating or decelerating the stepping motor, and by holding the driver input signal at a constant frequency when the stepping motor is to operate at a constant angular velocity.

While the prior art motor controller provides precise control over stepping motor operation, the rate of change of the overflow data controlling the rate multiplier can oscillate about a value proportional to the desired acceleration due to the nature of the accumulation process providing the overflow data. Since the rate multiplier produces an output signal of frequency proportional to the overflow data, the rate of change of frequency of the driver input signal also oscillates about some nominal value, thereby causing torque ripple in the stepping motor particularly at low motor speeds. While the amount of torque ripple is unobjectionable in most applications, such torque ripple is nonetheless objectionable in some applications requiring exceptionally smooth motor operation at low angular velocities.

SUMMARY OF THE INVENTION

In accordance with the present invention in a particular embodiment thereof, a motor controller supplies an input signal to a motor driver controlling rotation of a stepping motor. The frequency of the motor driver input signal controls the angular velocity of the stepping motor. To accelerate or decelerate the motor, the motor controller linearly increases or decreases the frequency of the motor driver input signal in proportion to a desired angular acceleration value conveyed in an input command.

The controller includes a computer periodically interrupted by a low frequency clock signal. Whenever interrupted, the computer adds the desired angular acceleration value to an accumulated velocity value and adds the accumulated velocity value to an accumulated displacement value. When the displacement value overflows to a lower value, the computer adjusts an output value in accordance with the amount of overflow. A hardware accumulator successively increments a number by the output value of the computer in response to successive cycles of a high frequency clock signal. Whenever the accumulated number overflows, the accumulator generates a pulse of the motor driver input signal.

Although the rate of change of the output value of the computer oscillates about a nominal value proportional to the desired angular acceleration value, the hardware accumulator effectively dampens such oscillation when producing the motor driver input signal. Thus, the stepping motor is substantially free of torque ripple even at relatively low speeds.

It is accordingly an object of the invention to provide an improved stepping motor controller that minimizes torque ripple.

The concluding portion of this specification particularly points out and distinctly claims the subject matter of the present invention. However, those skilled in the art will best understand both the organization and method of operation of the invention, together with further advantages and objects thereof, by reference to the following description taken in view of the accompanying drawings wherein like reference characters refer to like elements.

BRIEF DESCRIPTION OF THE DRAWING

FIG. 8 is a flow chart illustrating a first interrupt routine executed by the microprocessor of the stepping motor controller of FIG. 7;

FIG. 9 is a flow chart illustrating a second interrupt routine executed by the microprocessor of the stepping motor controller of FIG. 7; and FIG. 10 is a flow chart illustrating subroutine called by the interrupt routine of FIG. 9.

DESCRIPTION OF THE PREFERRED EMBODIMENT

Figure 1:
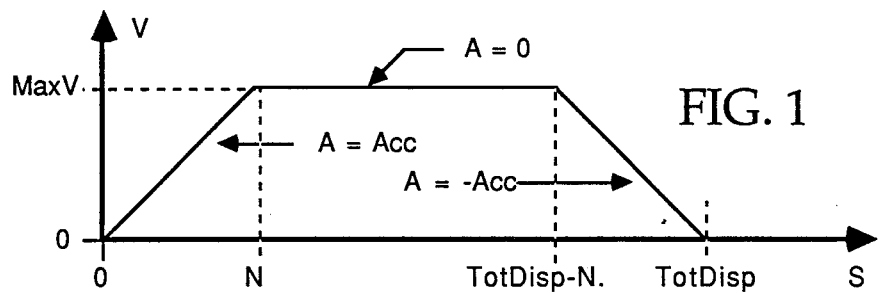
FIG. 1 illustrates an ideal angular velocity profile for a stepping motor.
Figure 2:
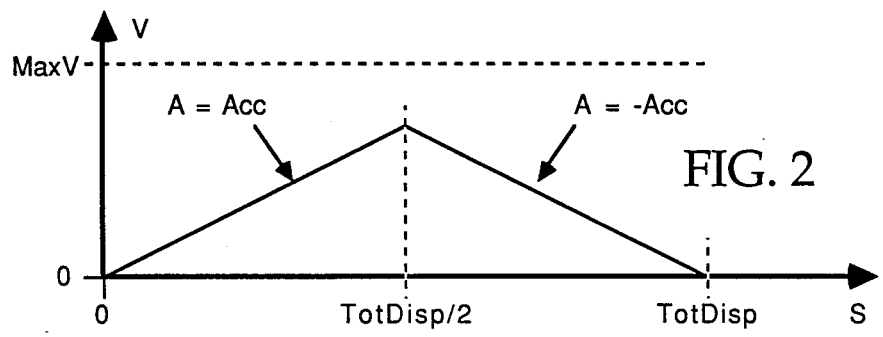
FIG. 2 illustrates another ideal angular velocity profile for a stepping motor.

FIG. 1 illustrates a desirable velocity response of a stepping motor to an output signal of a motor controller when the motor is to rotate through a desired total angular displacement starting and ending at rest. The stepping motor accelerates with a predetermined constant acceleration (A = +Acc) from rest to a desired maximum angular velocity and maintains that maximum velocity for a time. At the appropriate moment the motor begins decelerating at a constant rate (A = --Acc) so that the motor reaches zero angular velocity upon rotating through the desired total angular displacement. FIG. 2 illustrates the velocity response of the stepping motor when the desired rates of acceleration and deceleration are insufficient to permit the motor to reach maximum allowable velocity. In such case, the controller accelerates the motor during half of its total angular displacement and decelerates the motor during the remaining portion of its angular displacement.

Figure 3:
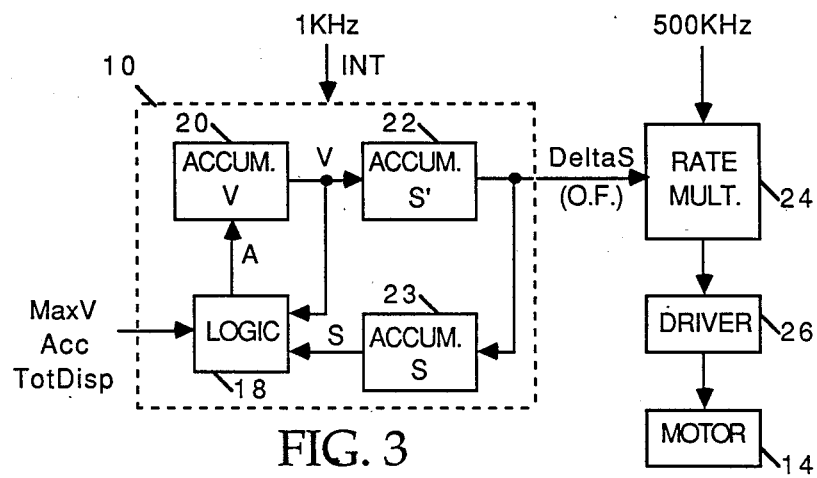
FIG. 3 illustrates data flow between data processing steps in a stepping motor controller of the prior art.

FIG. 3 is a data flow diagram illustrating data processing steps carried out by a prior stepping motor controller, described in my U.S. Pat. No. 4,734,847 entitled "Microstepping Motor Controller Circuit", issued Mar. 29, 1988, and incorporated herein by reference. A computer 10 receives and stores in a queue commands from a host computer, each command indicating a desired maximum angular velocity (MaxV) of a stepping motor 14, a desired rate of acceleration (Acc) and a total angular displacement (TotDisp) for the motor. A clock circuit (not shown) periodically interrupts computer 10 at a 1KHz rate, and the computer executes an interrupt routine whenever interrupted. A logic step 18 of the interrupt routine sets the value of acceleration parameter A to an appropriate value, initially the desired acceleration value Acc of the command now in execution. An accumulation step 20 accumulates the acceleration parameter to calculate a velocity parameter V. That is, during each successive execution of the interrupt routine, step 20 increments the value of V determined during a last execution of the interrupt routine by the value of A last selected by logic step 18. A second accumulation step 22 accumulates the velocity parameter to produce an angular displacement value S'. The value of S' is stored in a register of limited size and therefore S' overflows to a lower value when incremented beyond a maximum limit. However, the overflow bits of the S' accumulator are shifted into an overflow register and saved as the parameter DeltaS. The amount of overflow (DeltaS) of S' produced at step 22 is proportional to the incremental angular displacement of the stepping motor during the interval extending to the next interrupt. A third accumulation step 23 accumulates the DeltaS overflow value to generate a value S representing the total angular displacement of motor 14.

The interrupt routine also transmits the DeltaS value to a hardware rate multiplier 24 supplying a pulsed output signal to a stepping motor driver 26 controlling stepping motor 14. A rate multiplier is a device that generates an output signal of frequency proportional to input data. In FIG. 3, the frequency of the rate multiplier output signal is a fraction of an input 500 KHz clock signal, the fraction being determined by the current value of DeltaS. Thus, the prior art controller controls the rate of acceleration of stepping motor 14 by periodically adjusting the value of DeltaS controlling the frequency of the rate multiplier output signal.

The average rate of change of DeltaS is proportional to the value of the acceleration parameter A. Logic step 18 initially sets A equal to the acceleration parameter value Acc included in a controller input command, and the motor accelerates as illustrated by the positive slope portion of the velocity curve of FIG. 1. However, when V reaches MaxV, logic step 18 sets A equal to 0, thereby preventing further increases in V. This occurs at the end of the positive sloped portion of the velocity curve of FIG. 1. Logic step 18 remembers the value (N) of S at that point, and later, when logic step 18 detects the angular displacement S of the motor has reaches a value equal to TotDisp-N, step 18 sets A equal to --Acc such that V and DeltaS begin to decrease, eventually decelerating the stepping motor to zero angular velocity as the motor reaches the desired total angular displacement (TotDisp). Thus, when the acceleration parameter Acc conveyed in the command is large enough to permit the motor to reach the desired maximum velocity (MaxV), the prior art controller of FIG. 4 implements the velocity profile of FIG. 1.

When the angular acceleration Acc is relatively low, the total angular displacement S reaches one half of TotDisp before V reaches MaxV. At that point logic step 18 immediately changes A to −Acc from +Acc. Thus, the prior art system of FIG. 4 alternatively implements the velocity profile of FIG. 2 when the value of Acc specified by the input command is sufficiently low.

However, the velocity profiles produced by the prior system are not quite as linear as suggested by FIGS. 1 and 2, particularly when the output signal is of low frequency. The incremental angular displacement parameter DeltaS controlling angular velocity of the motor, being the overflow of an accumulation step 22, does not necessarily change at a constant rate when A is held constant. Although the value of DeltaS changes at an *average* rate proportional to the value of A, its rate of change varies about that average rate from interrupt to interrupt because DeltaS is an accumulation overflow.

Figure 4:
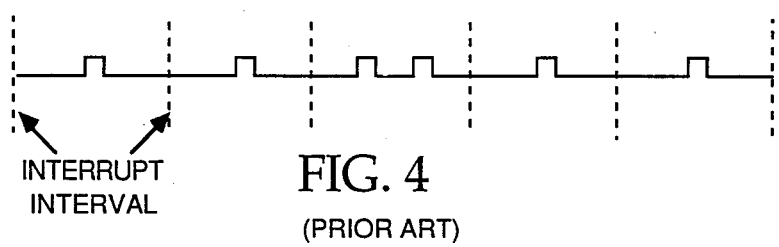
FIG. 4 is a timing diagram illustrating an output signal of the prior art stepping motor controller of FIG. 3.

For example, when the motor velocity reaches MaxV, the controller sets the acceleration parameter A to 0, indicating that the motor should rotate at a constant angular velocity. As long as accleration parameter A remains 0, velocity parameter V will remain constant from interrupt to interrupt. It is desired that DeltaS have a constant value proportional to V so that rate multiplier 24 produces a constant frequency output signal, thereby ensuring the motor rotates at a constant velocity proportional to MaxV. However, suppose MaxV is such that rate multiplier 24 generates an average of only 1.2 pulses per period between intererupts. During four of five interrupt intervals, the overflow DeltaS of accumulation step 22 has a value of 1 and during a fifth interrupt interval, DeltaS has a value of 2. Thus, DeltaS tells the rate multiplier to generate a single output signal pulse during four interrupt intervals, and tells the rate multiplier to generate two pulses during a fifth interrupt interval. While rate multiplier 24 produces an average of 1.2 output pulses between interrupts, the instantaneous frequency of its output signal is not constant. FIG. 4 illustrates the output signal produced by rate multiplier 24. (The pulse widths are exaggerated for illustrative purposes.) Note the frequency of the output signal oscillates, being one pulse per period during each of four periods and two pulses per period during a fifth period. This oscillation in frequency of the rate multiplier output signal can cause undesirable torque ripple in the stepping motor 14 of FIG. 3 since the motor accelerates and then decelerates once every five interrupt intervals. Torque ripple is also apparent when the acceleration parameter A is some constant value other than zero.

Figure 5:
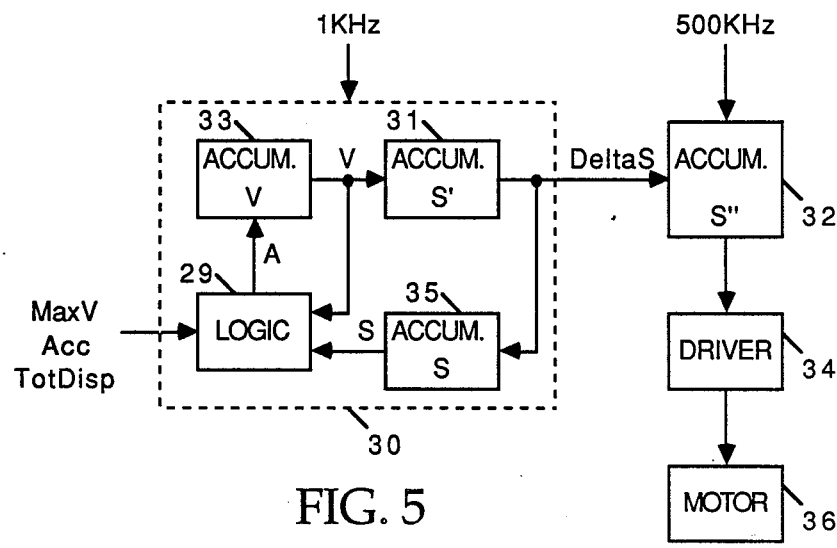
FIG. 5 illustrates data flow between data processing steps of a stepping motor controller in accordance with the present invention.

Referring to FIG. 5, a motor controller in accordance with the present invention includes a computer 30 similar to that of computer 10 of FIG. 3 executing a similar interrupt routine in response to a 1 KHz interrupt signal to supply a similar DeltaS output. However, in accordance with the present invention, the DeltaS output of computer 10 is supplied to a hardware accumulator 32 rather than to a rate multiplier 24 as in the controller of FIG. 3. In response to each pulse of the 500 KHz signal, accumulator 32 adds the value of DeltaS to an accumulated number S''. Whenever the accumulated number S'' overflows, accumulator 32 supplies an overflow bit as input to a driver circuit 34 controlling a stepping motor 36. Although the rate of change of DeltaS may still oscillate about a value proportional to A when A is held constant, accumulator 32 dampens the oscillation in the signal supplied to driver 34.

Figure 6:
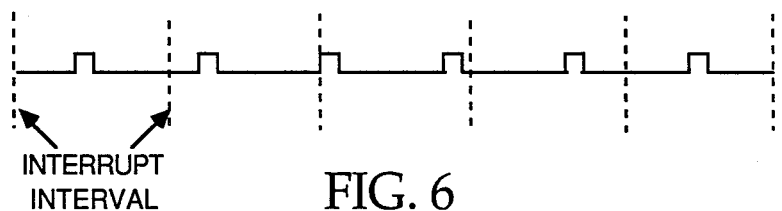
FIG. 6 is a timing diagram illustrating an output signal of the stepping motor controller of FIG. 5.

FIG. 6 illustrates the pulsed overflow output signal produced by accumulator 32 when acceleration is 0 and V is constant. Compare this to FIG. 4. Note that accumulator 32 produces six output pulses during five periods and that the pulses are evenly spaced. Thus, the frequency of the driver 34 input signal is constant and stepping motor 36 is substantially free of torque ripple due to oscillation in the driver input signal. The output signal of the accumulator 32 is also substantially free of frequency oscillation when the accleration parameter A is a constant other than zero. Thus, the controller of the present invention can also accelerate or decelerate the motor with minimal torque ripple.

Figure 7:
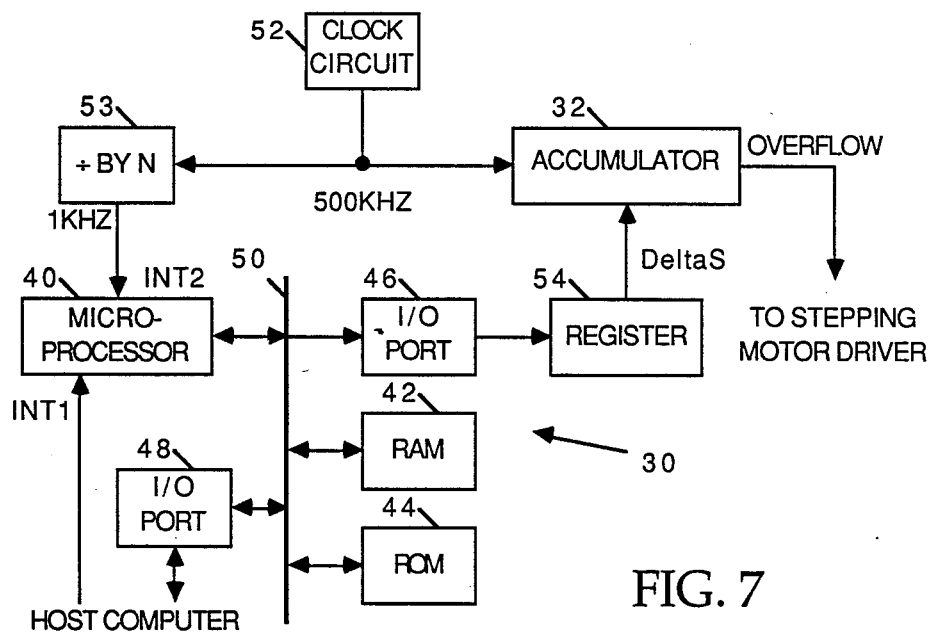
FIG. 7 is a block diagram of the stepping motor controller of the present invention.

FIG. 7 illustrates the motor controller of the present invention in more detailed block diagram form. The motor controller includes computer 30 comprising a microprocessor 40, a random access memory (RAM) 42, a read only memory (ROM) 44, and a pair of input/output (I/O) ports 46 and 48 all interconnected by computer bus 50. To transmit an input command to the controller, a host computer interrupts microprocessor 40 with interrupt signal INT1. The microprocessor, under program control of instructions stored in ROM 44, responds to the INT1 interrupt by obtaining an input command from the host computer via I/O port 44 and storing the command in a queue in RAM 42. The command specifies MaxV, Acc, and TotDisp parameters describing a desired rotation of the motor. The controller executes commands stored in the queue in the order received, thereby causing the motor to carry out a sequence of operations.

A clock circuit 52 produces a 500 KHz output signal, and a divide-by-N counter 53 frequency divides this signal to provide a 1 KHz interrupt signal INT2 input to microprocessor 40. In response to each pulse of the INT2 signal, microprocessor 40 executes an interrupt routine whereby it recalculates DeltaS and stores its value in a register 54 via I/O port 46. During the intervals between updates of DeltaS, accumulator 32 adds the value of DeltaS stored in register 54 to its internally stored number S'' on each pulse of the 500 KHz output of clock circuit 52. When the accumulator 32 increments the stored number S'' beyond its maximum limit, it overflows to a lesser value. An overflow bit of accumulator 32 provides an input signal pulse to the stepping motor driver 34 of FIG. 5 whenever the number accumulated by accumulator 32 overflows.

FIG. 8 illustrates the interrupt routine carried out by computer 30 of FIG. 7 in response to interrupt signal INT1 provided by the host computer when the host computer wishes to transmit a command to the controller. The command tells the controller to accelerate the motor from rest with a particular constant acceleration (Acc) until the motor reaches a particular maximum velocity (MaxV), and at the appropriate moment thereafter, to begin decelerating the motor at the −ACC rate. The controller chooses the moment to commence deceleration such that the motor comes to rest upon rotating through the particular angular displacement (TotDisp) indicated by the command.

Since the host computer can send commands faster than the controller can execute them, the controller stores those commands in a queue in RAM 42 and executes them one-by-ne in the order received. Accordingly as illustrated in FIG. 8, the computer responds to the INT1 interrupt from the host computer simply by obtaining the command conveying the TotDisp, MaxV, and Acc parameters from the host computer via port 48 (step 60) and storing the command in the "command queue" in RAM 42 of FIG. 7 (step 62).

FIG. 9 illustrates the interrupt routine executed by computer 30 of FIG. 7 in response to the 1KHz INT2 signal. Starting at step 70 the computer determines whether the S parameter representing the accumulated angular displacement of the motor has reached the limit referenced by the TotDisp parameter of the command now in execution. When S reaches TotDisp, the motor has completed its rotation in response to the command in execution. If so, the computer executes a "Get Command from Queue" subroutine (step 72). FIG. 10 illustrates the Get Command From Queue subroutine 72. Starting at step 74 the computer obtains the Acc, MaxV, and TotDisp parameter values from the next command in the queue, sets the A parameter equal to Acc (step 76), initializes parameters V, S, N and S' to 0 (step 78) and then returns. V and S are the accumulated angular velocity and displacement parameters referenced in FIG. 5. N is a parameter subsequently set equal to the current angular displacement of the motor when the motor attains maximum allowable velocity as illustrated in FIG. 1. S' is the parameter accumulated by accumulation step 31 of FIG. 5.

Referring again to FIG. 9, after executing step 2, or after step 70 when the current value of S is less than TotDisp, the computer determines whether N is greater than 0 (step 80). If so, the computer checks whether the accumulated angular displacement S has reached the value of TotDisp-N (step 82). This tells the computer to begin decelerating the motor (see FIG. 1), and if so, the computer responds by setting the acceleration parameter A equal to −Acc (step 84). However, if at step 80, the computer finds N is not greater than 0, it determines whether S has reached TotDisp/2 (step 86). This also tells the computer to begin decelerating the motor (see FIG. 2), and accordingly the computer sets A equal to −Acc (step 84). When at step 86 the computer finds S has not reached TotDisp/2, it checks the angular velocity V parameter and determines whether V has reached the value of the desired maximum angular velocity MaxV parameter (step 88). If so, the computer sets A equal to 0 and sets N equal to the current angular displacement S of the motor (step 90). Steps 70-90 collectively carry out the "logic step" 29 of FIG. 5, appropriately adjusting the value of A in response to input values of the V, S, MaxV, Acc and TotDisp parameters.

After adjusting the value of A at step 84 or 90, or after obtaining a negative result at step 82 or step 88, the computer increments V by the current value of A (step 92). Step 92 carries out the function of accumulation step 33 of FIG. 5. The computer next increments S' by the current value of V and stores DeltaS (the overflow of the S' accumulation) in register 54 of FIG. 7 (step 94). Step 94 implements accumulation step 31 of FIG. 5. Finally at step 96, the interrupt routine increments the current value of S by DeltaS, thereby performing accumulation step 35 of FIG. 5. The interrupt routine thereupon terminates.

As described hereinabove the stepping motor controller of the present invention supplies an input signal to a motor driver controlling rotation of a stepping motor. To accelerate or decelerate the motor, the controller linearly increases or decreases the frequency of the motor driver input signal at a rate proportional to a desired angular acceleration value conveyed in an input command. The controller includes a computer responding to a low frequency interrupt signal by periodically adding the acceleration value to an accumulated velocity value, adding the accumulated velocity value to an accumulated displacement value, and adjusting an output angular displacement value in accordance with the amount of overflow of the accumulated displacement value. A hardware accumulator responds to a high frequency clock signal by periodically incrementing an accumulated number by the output angular displacement value of the computer, the accumulator generating a pulse of the motor driver input signal whenever the accumulated number overflows.

Although the rate of change of the angular displacement value output of the computer oscillates about a nominal value determined by the acceleration value, the accumulator effectively dampens such oscillation when providing the motor driver input signal. Thus, the stepping motor rotates substantially free of torque ripple even at relatively low speeds.

While the foregoing specification has described a preferred embodiment of the present invention, one skilled in the art may make many modifications in such preferred embodiment without departing from the invention in its broader aspects. The appended claims are therefore intended to cover all such modifications as fall within the true spirit and scope of the invention.

I claim:

1. An apparatus responsive to high and low frequency clock signals for generating an output signal having a frequency changing linearly with time, the apparatus comprising:

means for periodically adjusting an output value in response to each cycle of said low frequency clock signal such that said output value has a rate of change oscillating about a predetermined constant value; and an accumulator for successively incrementing an accumulated value by an amount in accordance with the output value of said means in response to successive cycles of said high frequency clock signal, said accumulated value overflowing upon reaching a predetermined limit, said accumulator asserting a pulse of said output signal upon overflow of the accumulated value.

2. The apparatus in accordance with claim 1 wherein said means for periodically adjusting an output value comprises a computer executing an interrupt routine for changing said output value in response to each cycle of said low frequency clock signal.

3. The apparatus in accordance with claim 2 wherein said interrupt routine causes said computer to add said constant value to an accumulated velocity value and to add said accumulated velocity value to an accumulated displacement value, said accumulated displacement value overflowing to a lower value upon reaching another predetermined limit, said interrupt routine further causing said computer to adjust said output value in accordance with an amount of overflow of said accumulated displacement value.

4. A controller for supplying an input signal to a motor driver controlling rotation of a stepping motor in response to an input command including an angular acceleration value, wherein the velocity of the stepping motor is determined by a frequency of the motor driver input signal, the controller comprising:

means for generating high and low frequency clock signals;

a computer responsive to said input command for adjusting an output angular displacement value in response to each cycle of said low frequency clock signal such that said angular displacement value has a rate of change oscillating about a value proportional to said angular acceleration value; and an accumulator for successively incrementing an accumulated number by the angular displacement value in response to successive cycles of said high frequency clock signal, said accumulated number overflowing whenever reaching a particular limit, said accumulator producing an output pulse upon overflow of the accumulated value, successive output pulses of said accumulator forming the input signal to the stepping motor driver.

5. The controller in accordance with claim 4 wherein said means for generating said high and low frequency clock signals comprises:

means for generating said high frequency clock signal, and means for frequency dividing said high frequency clock signal to generate said low frequency clock signal.

6. The controller in accordance wth claim 4 wherein said computer provides an interrupt input for receiving said low frequency clock signal, each cycle of said low frequency clock signal interrupting said computer and causing said computer to execute an interrupt routine for adjusting said output angular displacement value.

7. A controller for supplying an input signal to a motor driver controlling rotation of a stepping motor in response to an input command including an angular acceleration value, wherein angular velocity of the stepping motor is determined by a frequency of the motor driver input signal, the controller comprising:

means for generating high and low frequency clock signals;

a computer receiving said input command and, in response to each cycle of said low frequency clock signal, adding said desired angular acceleration value to an accumulated velocity value and adding said accumulated velocity value to an accumulated displacement value, said displacement value overflowig to a lower value whenever reaching a maximum value, said computer adjusting an output value in accordance with an amount of overflow of said accumulated displacement value above said maximum value; and a hardware accumulator for successively incrementing an accumulated number by the output value of said computer in response to successive cycles of said high frequency clock signal, said accumulated number overflowing to a lower value when reaching a predetermined limit, said hardware accumulator providing a pulse of said input signal to the stepping motor driver in response to overflow of said accumulated number.

8. The controller in accordance with claim 7 wherein said means for generating said high and low frequency clock signals comprises:

means for generating said high frequency clock signal, and means for frequency dividing said high frequency clock signal to generate said low frequency clock signal.

9. The controller in accordance with claim 7 wherein said computer includes means providing an interrupt input for receiving said low frequency clock signal, each cycle of said low frequency clock signal interrupting said computer and causing said computer to execute an interrupt routine adjusting said output angular displacement value.

10. A method for generating a pulsed output signal having a frequency changing linearly with time, the method comprising the steps of:

generating high and low frequency signals;

adjusting an output value in response to each cycle of said low frequency signal such that said output value has a rate of change oscillating about a particular constant;

incrementing a number by said output value in response to successive cycles of said high frequency signal, said number overflowing to a lower value when incremented beyond a particular limit; and producing successive pulses of said output signal in response to successive overflows of said number.

11. A method for supplying an input signal to a motor driver controlling rotation of a stepping motor in response to an input command indicating a desired angular acceleration, wherein the velocity of the stepping motor is proportional to a frequency of the motor driver input signal, the method comprising the steps of:

generating high and low frequency clock signals;

adjusting an output angular displacement value in response to each cycle of said low frequency clock signal such that said angular displacement value has a rate of change oscillating about said desired angular acceleration;

incrementing a number by the angular displacement value in response to successive cycles of said high frequency clock signal, said number overflowing to a lower value when incremented beyond a particular limit;

producing an output pulse upon overflow of the number; and providing successive output pulses of said accumulator as the input signal to the stepping motor driver.

12. The method in accordance with claim 11 wherein the step of adjusting an output angular displacement value in response to each cycle of said low frequency clock signal comprises the substeps of:

adding said desired angular accleration value to an accumulated velocity value;

adding said accumulated velocity value to an accumulated displacement value, said accumulated displacement value overflowing to a lower value upon reaching a maximum value; and adjusting said angular displacement value in accordance with an amount of overflow of said accumulated displacement value.

* * * * *

UNITED STATES PATENT AND TRADEMARK OFFICE
CERTIFICATE OF CORRECTION

PATENT NO. : 4,890,048

DATED : December 26, 1989

INVENTOR(S) : L. WAYNE HUNTER

It is certified that error appears in the above-identified patent and that said Letters Patent is hereby corrected as shown below:

Column 1, line 19, after "rent" insert --changes--.

Column 1, line 22, after "object" delete the comma (,) and substitute a semicolon (;).

Column 6, line 60, delete "-ACC" and substitute ---Acc--.

Column 6, line 68, delete "one-by-ne" and substitute --one-by-one--.

Column 7, line 16, delete "from" and substitute --From--.

Column 7, line 29, "step 2" should be --step 72--.

Column 9, line 50, "flowig" should be --flowing--.

Signed and Sealed this

Thirteenth Day of August, 1991

Attest:

HARRY F. MANBECK, JR.

*Attesting Officer*   *Commissioner of Patents and Trademarks*